United States Patent [19]
Ross, Jr. et al.

[11] Patent Number: 5,859,692
[45] Date of Patent: Jan. 12, 1999

[54] HEIGHT SENSOR AND AIR SPRING APPARATUS INCORPORATING THE SAME IN THE AIR CHAMBER

[75] Inventors: Herbert G. Ross, Jr., Argyle; Agoston Horvath, Plano, both of Tex.

[73] Assignee: Rochester Gauges, Inc., Dallas, Tex.

[21] Appl. No.: 857,393

[22] Filed: May 16, 1997

[51] Int. Cl.$^6$ .............................. G01C 03/08; F16F 9/04
[52] U.S. Cl. ........................................ 356/4.01; 267/64.19
[58] Field of Search ................................ 356/4.01, 4.08; 280/707; 267/64.21, 64.19

[56] References Cited

U.S. PATENT DOCUMENTS

| | | | |
|---|---|---|---|
| 3,956,760 | 5/1976 | Edwards ................................... | 340/244 |
| 4,150,299 | 4/1979 | Kasiewicz et al. ...................... | 250/561 |
| 4,787,607 | 11/1988 | Geno et al. ........................... | 267/64.27 |
| 4,793,598 | 12/1988 | Geno et al. ........................... | 267/64.21 |
| 4,817,922 | 4/1989 | Hovance ............................... | 267/64.21 |
| 4,989,844 | 2/1991 | Wijnhoven et al. ................... | 267/64.24 |
| 5,337,137 | 8/1994 | Ogawa et al. ............................. | 356/4 |
| 5,707,045 | 1/1998 | Easter .................................... | 267/64.21 |

OTHER PUBLICATIONS

"Capacitance Type Level Detectors", The Instrument Engineers Handbook, vol. 1, B. Liptak ed., pp. 39–49.
"Neway Controlled Response Type CR Height Control Valve", Marketing Brochure, Neway Anchorlok International, 1995, 2 pages.
"Ridewell's Mega–Duty Height & Leveling Control Valve", Marketing Brochure, Ridewell Corp., 2 pages.
"Dockrite", Marketing Brochure, Neway Anchorlock International, 1996, 2 pages.

*Primary Examiner*—Mark Hellner
*Attorney, Agent, or Firm*—Sidley & Austin

[57] ABSTRACT

An air spring apparatus with an internal height sensor is provided. The air spring includes an end cap member, a piston member and a flexible annular sleeve connected therebetween forming a sealed air chamber. The height sensor includes a sensing element and an indicating element and is mounted within the air chamber. The sensing element is mounted to one of the end cap member and piston member. The indicating element has a first portion connected to the end cap member, a second portion connected to the piston member, and an elastic member connected therebetween. The length of the elastic member defines an indicating level sensible by the sensing element such that movement of the end cap member relative to the piston member produces a much smaller proportional movement of the indicating level relative to the sensing element. This proportion reduction of movement allows a smaller sensor to measure a relatively large change in height.

11 Claims, 3 Drawing Sheets

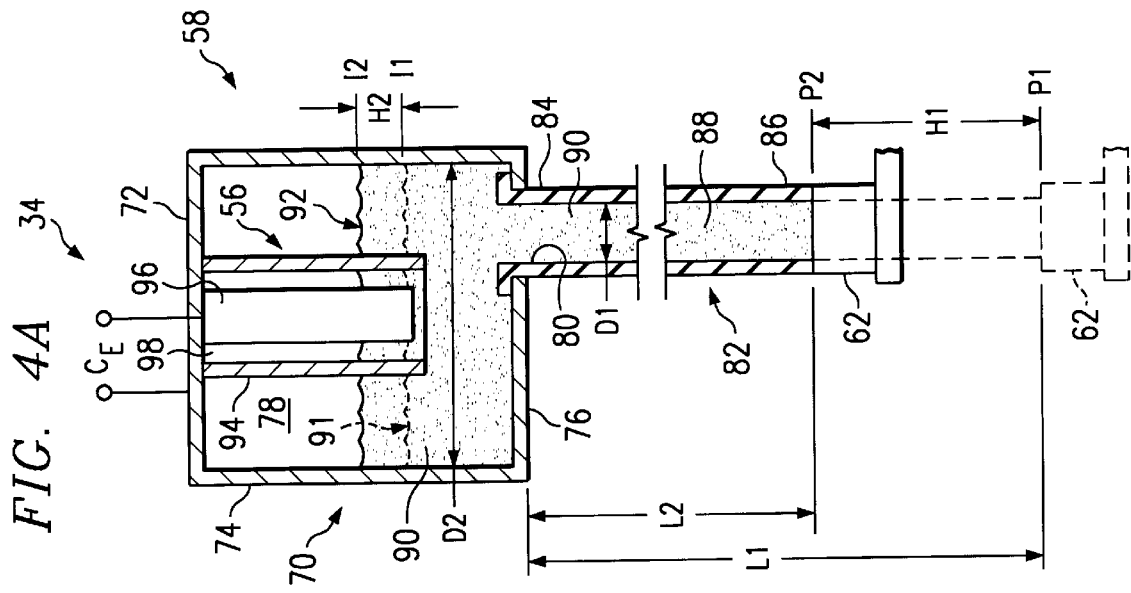
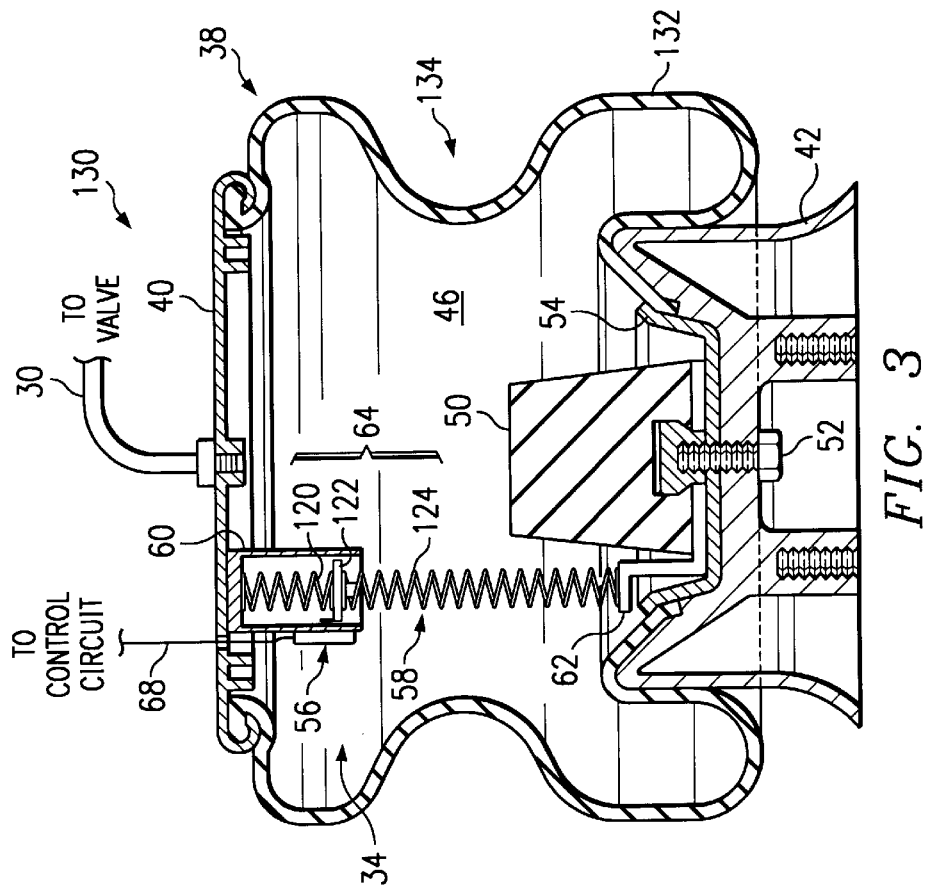

HEIGHT SENSOR AND AIR SPRING APPARATUS INCORPORATING THE SAME IN THE AIR CHAMBER

TECHNICAL FIELD OF THE INVENTION

The current invention relates to a height sensor for an air spring apparatus. In one aspect, it relates to an air spring apparatus incorporating a height sensor positioned inside the sealed air chamber of the air spring.

BACKGROUND OF THE INVENTION

Air springs, also known as pneumatic springs, have been used in the suspension systems of motor vehicles, industrial machinery, and buildings for a number of years. An air spring comprises first and second end members, at least one of which is typically shaped like a piston, with an intervening flexible annular sleeve forming a sealed air chamber or cavity therebetween.

When compressive loads are applied to the end members, air pressure within the air chamber provides an opposing force which cushions rapid inward movements and supports steady loads. The annular sleeve typically deforms during movement in a manner guided by the piston-shaped end member(s). An air passage is usually provided between the interior and exterior of the air chamber for selectively adding or releasing air from the air chamber.

Air springs positioned between movable parts of the suspension system of a vehicle can serve to cushion shock loads impressed on the vehicle's suspension by road irregularities, thus improving the ride of the vehicle and reducing vibrational stresses on the vehicle structure, its passengers, and cargo.

Air springs can also serve as load leveling devices to maintain the proper body height and attitude of a vehicle subjected to various loading conditions. Proper vehicle body height can be important both when the vehicle is moving, e.g., to maintain bumper height, rear vision, and fender clearances, and when the vehicle is stationary, e.g., to maintain position at a loading dock during loading or unloading. One conventional measure of vehicle body height is the axle-to-body distance, i.e., the distance from the axle to a fixed reference point on the body. This measure must usually be kept within a permissible range of values to assure proper vehicle operation.

To manually control axle-to-body distance, it is known to provide an air source connected to the air chamber of the air spring and a valve which allows a user to selectively add or release air from the air chamber as desired to increase or decrease, respectively, the axle-to-body distance. Manual height control systems are relatively simple to implement, however, they cannot assure that a given axle-to-body height is maintained under service conditions of changing load, leaking air lines, etc.

To automatically maintain axle-to-body distance within a permissible range of values, a position sensor or height sensor is needed to monitor the positional relationship of a reference point on the frame with respect to the axle. The output of the height sensor is typically connected (possibly by means of a control circuit) to an air source valve to automatically add or release air to insure that the desired axle-to-body height is maintained.

It is known that a height sensor for use with an air spring can be located either externally or internally with respect to the sealed air chamber of the air spring itself. Locating the height sensor externally exposes the sensor to damage, corrosion and contamination from the external environment. Locating the height sensor inside the air cavity of an air spring protects the sensor from damage or contaminants from the external environment. However, the air cavity within an air spring has a limited amount of open space, is frequently occupied by moving structures such as bumpers, and the air itself may be a source of contaminants. These factors can complicate the internal use of conventional height sensors such as those utilizing mechanical, magnetic, or optical properties, to measure axle-to-body height in an air spring. U.S. Pat. No. 5,337,137 describes and air spring apparatus incorporating an optical path height sensor located within the air cavity. This height sensor is provided with a signal processor circuit which comprises a logarithmic converter circuit, a filter, and a rectifier circuit to overcome the undesirable effects of the contamination of the reflective surfaces within the air cavity. Although such a system may allow the use of an optical height sensor within the air cavity of an air spring, the complexity of the control system can make it more difficult and costly to integrate such a sensor into a given control system.

A need therefore exists, for a height sensor which can be incorporated into the air cavity of an air spring, yet which is simple to adapt into existing control systems. A need also exists, for an air spring incorporating a height sensor inside the air cavity, which height sensor being durable and simple to adapt into existing control systems.

SUMMARY OF THE INVENTION

An object of the current invention is to provide a height sensor for an air spring apparatus which is capable of detecting the distance between two surfaces moving relative to one another. Another object of the current invention is to provide a height sensor and an air spring apparatus with a height sensor in which the height sensor will operate reliably in the internal environment of the air cavity of the air spring. Another object of the present invention is to provide a height sensor and an air spring apparatus with a height sensor in which the sensor output can be readily integrated into an existing control system.

In accordance with one aspect of the current invention, there is provided an air spring apparatus with a height sensor, comprising: an air spring including an end cap member, a piston member, and a flexible annular sleeve connected therebetween forming a sealed air chamber; and a height sensor mounted within the air chamber including a sensing element and an indicating element. The sensing element is mounted to one of the end cap member and the piston member. The indicating element has a first portion connected to the end cap member, a second portion connected to the piston member, and an elastic member connected therebetween and has a variable length. The length of the elastic member defines an indicating level sensible by the sensing element wherein a movement of the end cap member relative to the piston member produces a proportional movement of the indicating level relative to the sensing element.

In a first embodiment of this aspect of the current invention, the indicating element of the height sensor further comprises a reservoir member, an elastic tube member, and a fluid material. The reservoir member constitutes the first portion of the indicating element and is connected to the end cap member such that it moves with the end cap member. The reservoir member has a top wall, a side wall and a bottom wall defining a measurement cavity therewithin. The bottom wall has a passage formed therethrough. The elastic tube member constitutes the elastic member of the indicating element. The tube member has an upper end, a lower end, and an inner diameter defining a tube cavity therewithin and having a tube capacity. The upper end of the tube member is connected to the bottom wall of the reservoir member at the passage to form a fluid connection between the measurement cavity of the reservoir member and the tube cavity of the tube member. The lower end of the tube member is connected to the second portion of the indicating element to move with the piston element. The fluid material is disposed within the measurement cavity and tube cavity and has a free surface within the reservoir member defining the indicating level. Upon movement of the upper end of the tube member relative to the lower end of the tube member, the tube capacity changes to exchange the fluid material between the measurement cavity and the tube cavity to move the position of the indicating level within the reservoir member in proportion to the movement of the end cap member relative to the piston member. The change in position of the indicating level is sensed by the sensing element to provide an indication of the change in height between the end cap member and the piston member.

In accordance with a further embodiment of the above described invention, the position sensor of the sensing element further comprises a capacitance-type level indicator mounted to the top wall of the reservoir member and extending downwardly into the fluid material.

In yet another further embodiment of the above described invention, the position sensor of the sensing element further comprises a resistance-type level indicator mounted to the reservoir member and contacting the fluid material.

In still another further embodiment of the current invention, the position sensor of the sensing element further comprises a distance-measuring device mounted to the top wall of the reservoir member and sensing a distance to the free surface of the fluid material. In accordance with a further embodiment of the last-described invention, the distance measuring device is an octo-electric device using light to sense the distance to the free surface of the fluid.

In an alternative further embodiment of the last-described invention, the distance measuring device is an ultrasonic device using sound to sense the distance to the free surface of the fluid material.

In accordance with a second embodiment of the first aspect of the current invention, the elastic member of the indicating element further comprises an upper spring member, a lower spring member, and a pointer member. The upper spring member is connected between the first portion of the indicating element and the pointer member. The upper spring member has a first free length and a first spring constant. The pointer member is connected between the upper spring member and the lower spring member and defines an indicating level. The lower spring member is connected between the pointer member and the second portion of the indicating element. The lower spring member has a second spring length and a second spring constant. The first and second free lengths and the first and second spring constants are adapted to position the pointer member adjacent the sensing element wherein, a movement of the first portion of the indicator member relative to the second portion of the indicator member, produces a proportional change in the position of the pointer member relative to the sensing element. The change in position of the pointer member is sensed by the sensing element to provide an indication of the change in height between the end cap member and piston member to which the first and second portions of the indicating member are respectively attached. In a further embodiment of this aspect of the current invention, the position sensor of the sensing element further comprises a variable resistor mounted to the first portion of the indicator member.

In yet a further aspect of the current invention, a height sensor as described above is provided which is suitable for measuring the height between two surfaces independent of any association with an air spring.

BRIEF DESCRIPTION OF THE DRAWINGS

For a more complete understanding of the present invention, and for further details and advantages thereof, reference is now made to the following description taken in conjunction with the accompanying drawings in which:

FIG. 3 is a cross-sectional view, similar to FIG. 2, of an air spring apparatus having a height sensor according to a second aspect of the current invention.

FIG. 4A is an enlarged cross-sectional view showing the height sensor of FIG. 2 according to one embodiment of the current invention;

DETAILED DESCRIPTION

Figure 1:
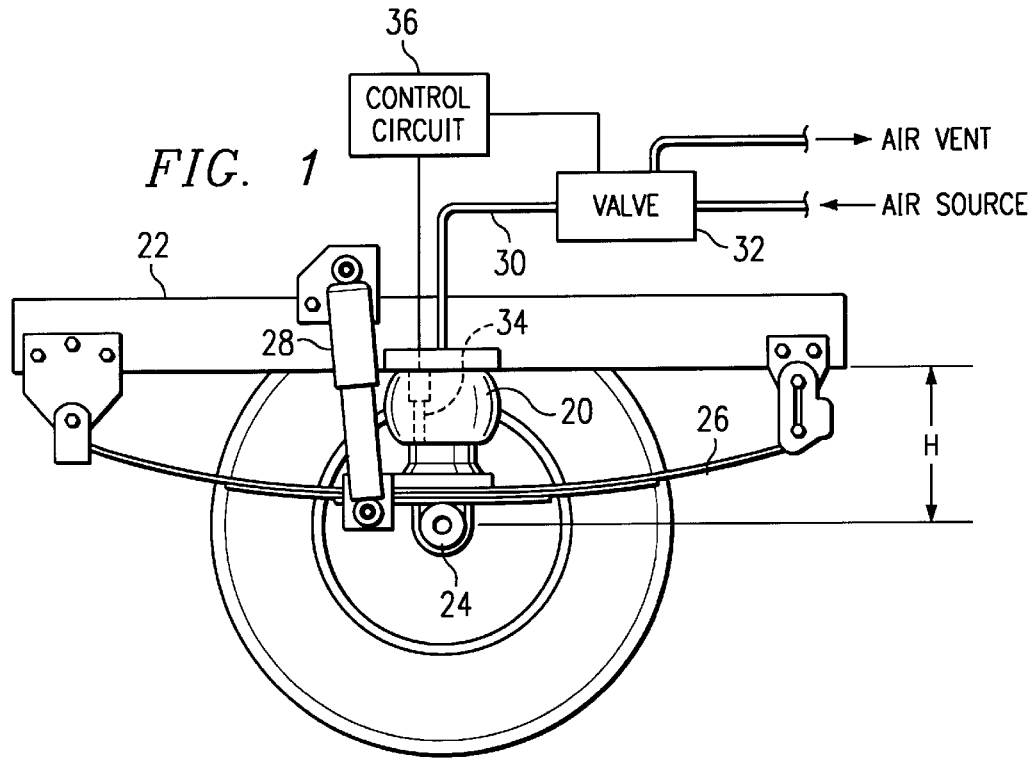
FIG. 1 is a schematic diagram illustrating an air spring apparatus mounted in the suspension system of a vehicle.

Referring to FIG. 1, an air spring apparatus 20 is disposed in the suspension system of a vehicle between a vehicle body 22 and the axle 24. A supplemental spring 26 of leaf, coil or other known designs and a shock absorber 28 can also be provided in the vicinity of air spring 20 as is known in the art. An air line 30 and valve 32 are connected to the air spring apparatus 20 for adding or releasing air from within the air spring, thereby making it possible to adjust the vehicle body height H and the spring constant of the suspension system. A height sensor 34 (shown in phantom) is incorporated into air spring apparatus 20, and is connected to a control circuit 36 for controlling the flow of air through valve 32. By the use of this apparatus, the air pressure within the air spring can be regulated by valve 32 on the basis of the vehicle height H detected by height sensor 34, thereby making it possible to automatically adjust the vehicle height and the spring constant.

Figure 2:
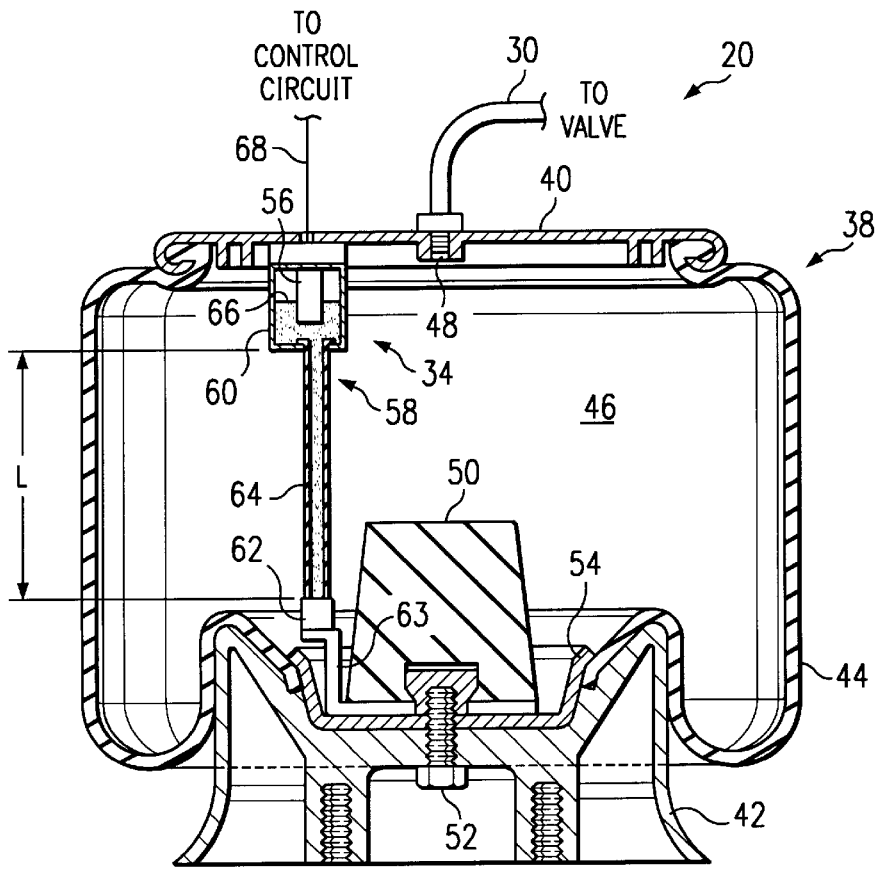
FIG. 2 is an enlarged cross-sectional view of the air spring apparatus shown in FIG. 1 having a height sensor according to a first aspect of the current invention.

Referring now to FIG. 2, an enlarged cross-sectional view is shown of an air spring apparatus 20 incorporating a height sensor according to a first aspect of the current invention. Apparatus 20 comprises an air spring 38 and a height sensor 34. Air spring 38 includes an end cap member 40, a piston member 42 and a flexible annular sleeve 44. One end of flexible sleeve 44 is sealed to the outer periphery of end cap member 40 and the other end is sealed to piston member 42. Thus, a sealed air chamber or cavity 46 is formed inside flexible sleeve 44. An air passage 48 is provided in air line 30 and connected to valve 32 (not shown) to allow air to be added or withdrawn from within air chamber 46 for controlling the air pressure within the air spring. While it is preferred that air passage 48 be formed through end cap member 40 as shown in FIG. 2, it will readily be appreciated that the air passage can also be formed in piston member 42 or annular sleeve 44. A bumper member 50 can be provided in air chamber 46 to limit the movement of end cap member 40 relative to piston member 42. Bumper member 50 is preferred but not required. In the embodiment shown in FIG. 2, bumper member 50 comprises a rubber block connected to piston member 42 by retaining bolt 52 and also serves to retain keeper member 54 which seals the lower end of flexible sleeve 44 to piston member 42. It will be readily appreciated that the specific configuration of bumper member 50, bolt 52 and keeper member 54 could be modified while keeping within the scope of the current invention.

The height sensor 34 mounted within air chamber 46 comprises a sensing element 56 and an indicating element 58. The sensing element 56 can be mounted to one of the end cap member 40 and piston member 42. In the embodiment shown in FIG. 2, sensing element 56 is mounted to end cap member 40, however, it will readily be appreciated that alternative designs having sensing element 56 mounted to piston member 42 are within the scope of the current invention. The indicating element 58 of height sensor 34 has a first portion 60 connected to the end cap member 40, a second portion 62 connected to the piston member 42 and an elastic member 64 connected between the first and second portions 60, 62 and having a variable length L. In the embodiment shown in FIG. 2, first portion 60 is directly connected to end cap member 40 and thus moves with end cap member 40 while second portion 62 is connected to piston portion 42 by means of a depending portion 63 which is captured between piston portion 42 and bumper member 50 along with keeper member 54 such that these elements all move with piston member 42. Relative movement between end member 40 and piston member 42 will result in identical relative movement between first portion 60 and second portion 62, and thus changing the length L of elastic member 64. The length L of elastic member 64 defines an indicating level 66 which is sensible by sensing element 56, wherein a movement of end cap member 40 relative to piston member 42 produces a proportional movement of the indicating level 66 relative to sensing element 56. Sensing element 56 is connected to control circuit 36 (not shown) by a sensor lead 68 which carries a signal indicating the height being measured by height sensor 34.

Referring now to FIG. 4A, an enlarged view is shown of one embodiment of a height sensor 34 for use in an air spring apparatus according to one aspect of the current invention. This embodiment of height sensor 34 comprises a sensing element 56 and an indicating element 58. Indicating element 58 further comprises a reservoir member 70 which constitutes the first portion of the indicating element and is connected to end cap member 40 (not shown). The reservoir member 70 has a top wall 72, a side wall 74, and a bottom wall 76 defining a measurement cavity 78 therewithin. Reservoir member 70 moves with the end cap member 40 to which it is connected. The bottom wall 76 of reservoir member 70 has a passage 80 formed therethrough. Indicating element 58 further comprises an elastic tube member 82 constituting the elastic member of the indicating element 58. In a preferred embodiment, elastic tube member 82 is formed of an elastomeric material such as rubber, however, other elastic materials known in the art could be substituted for rubber therein. Tube member 82 has an upper end 84, a lower end 86, and an inner diameter D1 defining a tube cavity 88 therewith and having a tube capacity. The upper end 84 of the tube member 82 is connected to the bottom wall 76 of the reservoir member 70 at passage 80 to form a fluid connection between measurement cavity 78 and tube cavity 88. The lower end 86 of the tube member 82 is connected to the second portion 62 of indicating element 58, which moves with piston member 42 (not shown). Indicating element 58 further comprises a fluid material 90 disposed within the measurement cavity 78 and the tube cavity 88 and having a free surface 91 (shown in phantom) or 92 within the reservoir member 70 defining corresponding indicating levels I1 and I2, respectively. The fluid material 90 is selected to remain fluid over the anticipated temperature operating range of the apparatus, to have predictable thermal expansion characteristics, and to have dielectric, conductivity, or other properties which are compatible with the type of sensor used in sensing element 56. Upon movement of the upper end 84 of tube member 82 relative to the lower end 86 of tube member 82, the length of tube member 82 changes, thus changing the tube capacity and causing an exchange of fluid material 90 between the measurement cavity 78 and the tube cavity 88. The exchange of fluid material 90 between cavities 78 and 88 moves the position of the free surface constituting the indicating level within reservoir member 70 in proportion to the movement of end cap 40 relative to the piston member 42. This change in position of the indicating level is sensed by sensing element 56 to provide an indication of the change in air spring height between the end cap member 40 and piston member 42.

To further illustrate the operation of the height sensor, an example for the embodiment shown in FIG. 4A is presented. Height sensor 34 has an elastic tube member 82 with a length (shown alternatively as L1 or L2) and circular cross section with diameter D1 as shown. The reservoir member 70 similarly has a circular cross section with diameter D2 as shown. Elastic tube member 82 is connected at upper end 84 to the reservoir member 70, which constitutes the first portion of indicating element 58 and moves with the end cap member 40 (not shown). The lower end 86 of tube member 82 is connected to the second portion 62 of indicating element 58, which moves with the piston member 42 (not shown) as previously described. A quantity of fluid material 90 is disposed within tube cavity 88 and measurement cavity 78 to form a free surface 91 (shown in phantom) at reference indicating level I1 when the second portion 62 is at reference position P1. When the second portion 62 moves by height H1, relative to reservoir member 70, from reference position P1 to measured position P2, the length of tube member 82 changes from a value L1 to a value L2, but the diameter D1 does not change significantly. Thus, the change in the capacity, ΔC, of tube member 82 is given by:

$$\Delta C = (\pi/4) \times D1^2 \times (L1 - L2)$$

The excess fluid material 90, in the amount ΔC, is displaced from tube cavity 88 into measurement cavity 78 of reservoir member 70, causing the free surface (now shown as 92) to rise by a height H2 from reference indicating level I1 to measured indicating level I2, where H2 is given by:

$$H2 = \Delta C / ((\pi/4) \times D2^2)$$

Since H1=L1−L2, the previous equations for ΔC and H2 can be used to calculate a proportionality factor between the change in height H2 and the change in height H1 based on the difference in relative cross-sectional area of tube member 82 and reservoir member 70. In this example, change H2 is proportional to change H1 as follows:

$$H2 = (D1^2/D2^2) \times H1$$

The proportionality factor for the height sensor in this example is a constant ($D1^2/D2^2$). Using sensing element 56 to measure the change in height H2 of the reservoir indicating level from level I1 to level I2, and then applying the known proportionality factor for the height sensor, the change in height H1 between end cap member 40 and piston member 42 can be determined. Thus, the proportionality factor of the height sensor 58 allows relatively large changes in air spring height H1 to produce relatively small changes in indicating height H2 such that reservoir member 70 and sensing element 56 can be sized to fit within the space limitations of the air spring cavity.

It will be appreciated that while the embodiment discussed above utilizes an elastic tube member 82 and reservoir member 70 having circular cross sections, height sensors with elements having different cross sections, thereby resulting in proportionality factors having different magnitudes, different linearity characteristics, and even sensors having non-linear proportionality factors, would be within the scope of the current invention.

Figure 4B:
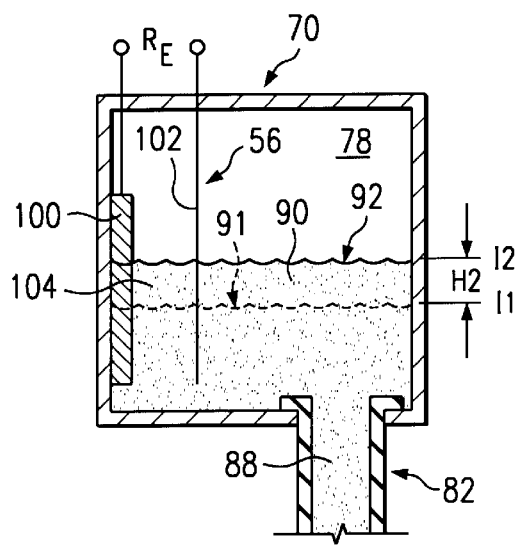
FIG. 4B is a fragmentary cross-sectional view, similar to FIG. 4A, showing a height sensor according to a second embodiment of the current invention.
Figure 4C:
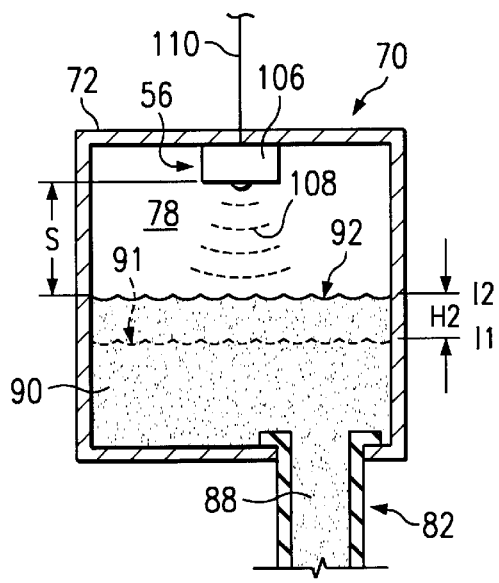
FIG. 4C is a fragmentary cross-sectional view, similar to FIG. 4A, showing a height sensor according to a third embodiment of the current invention.

Referring now to FIGS. 4A, 4B and 4C, examples are presented of sensing elements 56 that can be used to sense the change in height H2 of the indicating level from level I1 to level I2. In the embodiment shown in FIG. 4A, sensing element 56 comprises a capacitance-type level sensor having an outer cylindrical plate 94 and an inner cylindrical plate 96 separated by a dielectric gap 98. The effective capacitance $C_E$ of the level indicator will change depending on the portion of dielectric gap 98 occupied by fluid material 90. The capacitance of sensing element 56 can be readily sensed by circuits known in the art to provide an electrical indication of height H2 of measured level I2 above reference level I1. The height H1 of the air spring position P2 relative to reference position P1 can then be calculated using H2 and the proportionality factor for the tube member and reservoir member as previously described.

Referring now to FIG. 4B, alternative sensing element 56 comprises a resistive member 100 and an electrode 102 separated by a gap 104. In this embodiment, liquid material 90 is conductive such that an electrical circuit is completed between resistive member 100 and electrode 102. The circuit resistance $R_E$ will vary according to the position of indicating level I1 or I2 on resistive member 100. The resistance $R_E$ of the circuit can readily be sensed by circuits known in the art, thus allowing sensing element 56 to determine the height H2 of measurement indicating level I2 above reference level I1. As previously discussed, H2 is proportional to the height H1 (as shown in FIG. 4A) of actual air spring position P2 above reference air spring position P1.

Referring now to FIG. 4C, yet another alternative, sensing element 56 comprises a distance measuring device 106 mounted to top wall 72 of reservoir member 70 and sensing a distance S to the free surface 92 of fluid material 90 using sensing waves 108. In one embodiment, the distance measuring device 106 is an opto-electric device of a type known in the art and sensing waves 108 are light rays sensing the distance S to free surface 92 of fluid material 90. In an alternative embodiment, distance measuring device 106 is an ultrasonic device and sensing waves 108 are sound waves used to sense distance S to the free surface 92 of fluid material 90. An electrical lead 110 will carry the sensed height information to a circuit of a type known in the art indicating the height H2 of measured indicating level 92 above reference indicating level I1 and thus the height H2 (as shown in FIG. 4A) of the air spring as previously discussed.

Figure 5:
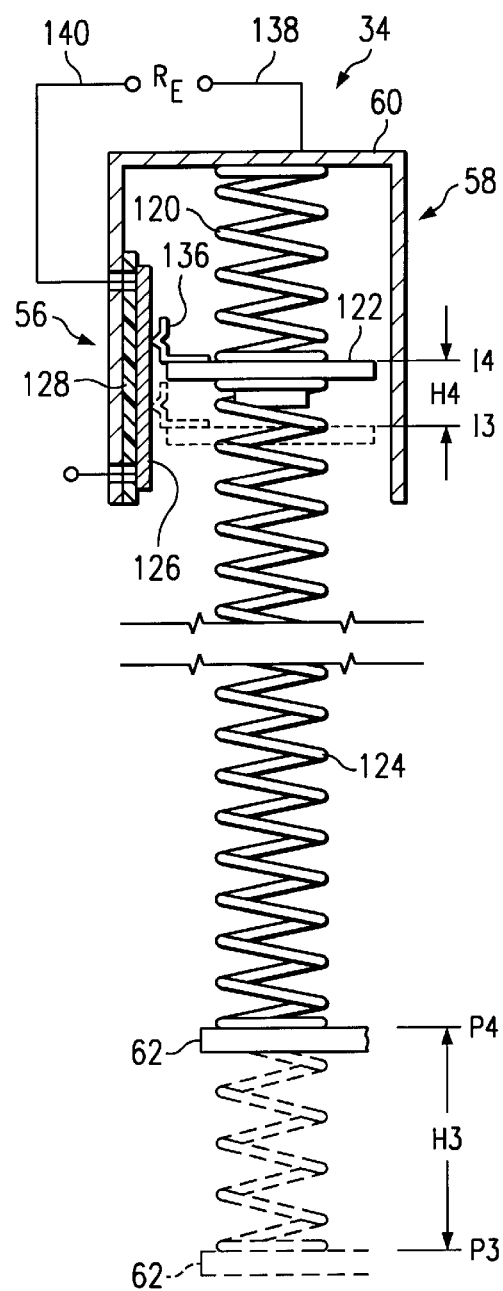
FIG. 5 is an enlarged cross-sectional view showing the height sensor of FIG. 3 according to a second aspect of the current invention.

Referring now to FIG. 3, an air spring apparatus 130 is shown comprising an air spring 38 and a height sensor 34 according to the second aspect of the current invention. Referring now also to FIG. 5, height sensor 34 has an elastic member 64 which comprises an upper spring member 120, a lower spring member 124 and a pointer member 122. One end of upper spring member 120 is connected to a first portion 60 of indicating element 58, which moves with end cap member 40, and the other end is connected to pointer member 122. One end of lower spring member 124 is connected to second portion 62 of indicating element 58, which moves with piston member 42, and the other end is connected to pointer member 122 opposite the connection of upper spring 120. Upper spring member 120 has a first free length, F1, and a first spring constant K1 and lower spring member 124 has a second free length, F2, and a second spring constant, K2. The vertical position of pointer member 122 defines an indicating level I3 or I4 which is sensible by sensing element 56. First and second free lengths F1 and F2 and first and second spring constants K1 and K2 are selected to position pointer member 122 at a reference indicating level I3 when second portion 62 is at reference position P3. A change H3 in the position of second portion 62 of height sensor 34 from reference position P3 to measured position P4 will cause a change H4 in the position of the pointer member 122 between indicating levels I3 and I4, and a proportionality factor between H3 and H4 can be determined using conventional spring equations and the values for F1, F2, K1 and K2.

The sensing element 56 in this embodiment comprises a variable resistor 126 mounted to first portion 60. In the embodiment shown in FIG. 5, an insulating layer 128 is positioned between variable resistor 126 and first portion 60 to prevent short circuits if first portion 60 is made of conductive material. A contact member 136 which is electrically connected to upper spring member 120, is mounted on pointer member 122. Pointer member 136 is adapted to contact variable resistor 126, thus completing a electrical circuit between a first terminal 138, which is electrically connected to the upper end of upper spring member 120, and a second terminal 140, which is electrically connected to one end of variable resistor 126. It will be readily appreciated that the resistance $R_E$ of this circuit will vary as the position of pointer member 122, and hence of contact member 136, moves along variable resistor 126 between its position at reference indicating level I3 (shown in phantom) and its position at measured indicating level I4. The resistance $R_E$ corresponds to the position that the second portion 62 of height sensor 34 moves between reference position P3 and measured position P4 as described above. A circuit of the type known in the art can sense resistance $R_E$ and produce an appropriate electrical signal for use in a display or control system. Air spring 38 of the embodiment shown in FIG. 3 is similar in most respects to the air spring previously described, having an end cap 40 at the upper end, a piston member 42 at the lower end, and a flexible sleeve 132 connected therebetween. In this embodiment, however, flexible sleeve 132 has one or more annular convolutions 134, which further limits the space within air chamber 46 available for positioning height sensor 34. Note that the presentation of air spring apparatus 130 having an air spring with annular convolutions 134 and a height sensor 34 according to a second aspect of the current invention is not intended to imply that a height sensor incorporating upper and lower spring members is required for use, or even that it is preferred for use, when annular convolutions 134 are present in flexible sleeve 132. Instead, it is intended to further illustrate that height sensors 34 according to either the first or second aspect of the current invention can be utilized in an air spring apparatus having air springs of different configurations.

Referring again to FIGS. 4A, 4B, 4C and 5, in another aspect of the current invention, the height sensors previously described as being incorporated in the air chamber of an air spring can be used independently of an air spring to provide an indication of the height between any two surfaces moving vertically relative to one another. In this aspect, the first portion 60 of the indicating element 58 is connected to the first surface to be measured, and the second portion 62 of the indicating element 58 is connected to the second surface to be measured. A change in the distance between the surfaces to be measured from the reference distance will produce a corresponding proportional movement of the indicating level which is sensible by a sensing element 56. The proportional relationship between the actual distance (H1 or H3) moved between the positions (P1 and P2 or P3 and P4, respectively) of the surfaces being measured and the corresponding distance (H2 or H4, respectively) moved by the indicating levels (I1 and I2 or I3 and I4, respectively) being sensed by the sensing element 56 in the height sensor of the current invention allows the use of small sensing elements to measure large movements between surfaces.

The foregoing disclosure of the invention in specific embodiments is intended to be illustrative only. The invention is adaptable to a number of varying embodiments without departing from the scope and spirit of the embodiments without departing from the scope or spirit of the appended claims.

I claim:

1. An air spring apparatus with a height sensor, comprising:
   an air spring including an end cap member, a piston member, and a flexible annular sleeve connected therebetween forming a sealed air chamber;
   a height sensor being mounted within said air chamber including a sensing element and an indicating element;
   said sensing element being mounted to one of said end cap member and said piston member;
   said indicating element having a first portion connected to said end cap member, a second portion connected to said piston member, and an elastic member connected therebetween and having a variable length;
   said length of said elastic member defining an indicating level sensible by said sensing element;
wherein a movement of said end cap member relative to said piston member produces a proportional movement of said indicating level relative to said sensing element.

2. An air spring apparatus with a height sensor according to claim 1, wherein said indicating element further comprises:
   a reservoir member constituting said first portion of said indicating element connected to said end cap member;
   said reservoir member having a top wall, a side wall, and a bottom wall defining a measurement cavity therewithin and moving with said end cap member;
   said bottom wall having a passage formed therethrough;
   an elastic tube member constituting said elastic member of said indicating element;
   said tube member having an upper end, a lower end, and an inner diameter defining a tube cavity therewithin and having a tube capacity;
   said upper end of said tube member being connected to said bottom wall of said reservoir member at said passage to form a fluid connection between said reservoir member and said tube member;
   said lower end of said tube member being connected to said second portion of said indicating element to move with said piston element; and
   a fluid material disposed within said measurement cavity and said tube cavity and having a free surface within said reservoir member defining said indicating level;
wherein, upon movement of said upper end of said tube member relative to said lower end of said tube member, the tube capacity changes to exchange said fluid material between said reservoir member and said tube member to move the position of said indicating level within said reservoir member in proportion to movement of said end cap member relative to said piston member.

3. An air spring apparatus with a height sensor according to claim 2, wherein said sensing element further comprises:
   a capacitance-type level indicator mounted to said top wall of said reservoir member and extending downwardly into said fluid.

4. An air spring apparatus with a height sensor according to claim 2, wherein said sensing element further comprises:
   a resistance-type level indicator mounted to said reservoir member and contacting said fluid.

5. An air spring apparatus with a height sensor according to claim 2, wherein said sensing element further comprises:
   a distance-measuring device mounted to said top wall of said reservoir member and sensing a distance to said free surface of said fluid.

6. An air spring apparatus with a height sensor according to claim 5, wherein said distance measuring device is an opto-electric device using light to sense said distance to said free surface of said fluid.

7. An air spring apparatus with a height sensor according to claim 5, wherein said distance measuring device is an ultrasonic device using sound to sense said distance to said free surface of said fluid.

8. An air spring apparatus with a height sensor according to claim 1, wherein said elastic member of said indicating element further comprises:
   an upper spring member, a lower spring member, and a pointer member;
   said upper spring member connected between said first portion of said indicating element and said pointer member;
   said upper spring member having a first free length and a first spring constant;
   said pointer member being connected between said upper spring member and said lower spring member and defining an indicating level;
   said lower spring member being connected between said pointer member and said second portion of said indicating element;
   said lower spring member having a second free length and a second spring constant;
   said first and second free lengths and said first and second spring constants adapted to position said pointer member adjacent said sensing element;
wherein, upon movement of said first portion of said indicator member relative to said second portion of said indicator member, the position of said pointer member changes relative to said sensing element in proportion to movement of said end cap member relative to said piston member.

9. An air spring apparatus with a height sensor according to claim 8, wherein said sensing element further comprises:

a variable resistor mounted to said first portion of said indicator member.

10. A height sensor for measuring the change in height between two surfaces, comprising:

a sensing element being mounted to one of a first surface and a second surface, said surfaces separated by a first height;

an indicating element having a first portion connected to said first surface, a second portion connected to said second surface, and an elastic member connected therebetween and having a range of lengths;

each said length of said elastic member defining a different indicating level sensible by said sensing element;

wherein a change in height of said first surface relative to said second surface produces a proportional change of said indicating level relative to said sensing element; and wherein said indicating element further comprises:

a reservoir member constituting said first portion of said indicating element connected to said first surface;

said reservoir member having a top wall, a side wall, and a bottom wall defining a measurement cavity therewithin and moving with said first surface;

said bottom wall having a passage formed therethrough;

an elastic tube member constituting said elastic member of said indicating element;

said tube member having an upper end, a lower end, and an inner diameter defining a tube cavity therewithin and having a tube capacity;

said upper end of said tube member being connected to said bottom wall of said reservoir member at said passage to form a fluid connection between said reservoir member and said tube member;

said lower end of said tube member being connected to said second portion of said indicating element to move with said second surface; and a fluid material disposed within said measurement cavity and said tube cavity and having a free surface within said reservoir member defining said indicating level;

wherein, upon movement of said upper end of said tube member relative to said lower end of said tube member, the tube capacity changes to exchange said fluid material between said reservoir member and said tube member to move the position of said indicating level within said reservoir member in proportion to movement of said first surface relative to said second surface.

11. A height sensor for measuring the change in height between two surfaces, comprising:

a sensing element being mounted to one of a first surface and a second surface, said surfaces separated by a first height;

an indicating element having a first portion connected to said first surface, a second portion connected to said second surface, and an elastic member connected therebetween and having a range of lengths;

each said length of said elastic member defining a different indicating level sensible by said sensing element;

wherein a change in height of said first surface relative to said second surface produces a proportional change of said indicating level relative to said sensing element; and wherein said elastic member of said indicating element further comprises an upper spring member, a lower spring member, and a pointer member;

said upper spring member being connected between said first portion of said indicating element and said pointer member;

said upper spring member having a first free length and a first spring constant;

said pointer member being connected between said upper spring member and said lower spring member and defining an indicating level;

said lower spring member being connected between said pointer member and said second portion of said indicating element;

said lower spring member having a second free length and a second spring constant;

said first and second free lengths and said first and second spring constants adapted to position said pointer member adjacent said sensing element;

wherein, upon movement of said first portion of said indicator member relative to said second portion of said indicator member, the position of said pointer member changes relative to said sensing element in proportion to movement of said first surface relative to said second surface.

* * * * *

UNITED STATES PATENT AND TRADEMARK OFFICE
CERTIFICATE OF CORRECTION

PATENT NO. : 5,859,692
DATED : January 12, 1999
INVENTOR(S) : Ross, Jr. et al.

It is certified that error appears in the above-identified patent and that said Letters Patent is hereby corrected as shown below:

Column 8, line 40, replace second occurrance of "Pointer" with --Contact--.

Signed and Sealed this

Twenty-sixth Day of October, 1999

Attest:

Q. TODD DICKINSON

*Attesting Officer*     *Acting Commissioner of Patents and Trademarks*